(12) United States Patent
Kuster et al.

(10) Patent No.: US 9,097,442 B2
(45) Date of Patent: Aug. 4, 2015

(54) MADE TO ELEMENTS CAPABLE OF COLLECTING LIGHT

(75) Inventors: Hans-Werner Kuster, Aachen (DE); Franz Karg, Munich (DE); Walter Stetter, Illertissen (DE); Robert Gass, Herzogenrath (DE); Joerg Baumbach, Munich (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 394 days.

(21) Appl. No.: 12/738,218

(22) PCT Filed: Oct. 13, 2008

(86) PCT No.: PCT/EP2008/063744
§ 371 (c)(1),
(2), (4) Date: Jun. 9, 2010

(87) PCT Pub. No.: WO2009/050144
PCT Pub. Date: Apr. 23, 2009

(65) Prior Publication Data
US 2010/0258158 A1 Oct. 14, 2010

(30) Foreign Application Priority Data

Oct. 16, 2007 (FR) ...................................... 07 58350
Apr. 3, 2008 (FR) ...................................... 08 52216

(51) Int. Cl.
*F24J 2/52* (2006.01)
*H01L 31/042* (2014.01)

(52) U.S. Cl.
CPC .............. *F24J 2/5254* (2013.01); *F24J 2/5232* (2013.01); *H02S 20/00* (2013.01); *F24J 2002/5222* (2013.01); *F24J 2002/5298* (2013.01); *Y02B 10/12* (2013.01); *Y02E 10/47* (2013.01); *Y02E 10/50* (2013.01)

(58) Field of Classification Search
CPC .............. H01L 31/042; H01L 31/0482; H01L 31/0484; H01L 31/0422; H01L 31/0483; F24J 2/0455; F24J 2/5201; F24J 2/52; F24J 2/5203; F24J 2/5205; F24J 2/5207; F24J 2/5211; F24J 2/5209; F24J 2/5233; F24J 2/5252; F24J 2/5262; F24J 2/526; F24J 2/523; F24J 2/5232; F24J 2002/5203; F24J 2002/5215; F24J 2002/5218; F24J 2002/5222; F24J 2002/5224; F24J 2002/5226
USPC .................. 136/243–265; 52/173.3; 51/173.3
See application file for complete search history.

(56) References Cited

U.S. PATENT DOCUMENTS 5,143,556 A    9/1992  Matlin
5,180,442 A *  1/1993  Elias ............................. 136/251
(Continued)

FOREIGN PATENT DOCUMENTS

DE          40 14 200       11/1990
DE      10 2004 009 935      9/2005
(Continued)

OTHER PUBLICATIONS

Machine translation of WO2006/121013A1.*
(Continued)

*Primary Examiner* — Jeffrey T Barton
*Assistant Examiner* — Eric R Smith
(74) *Attorney, Agent, or Firm* — Oblon, McClelland, Maier & Neustadt, L.L.P.

(57) ABSTRACT

The invention relates to an element capable of collecting light, including a first substrate having a glass function and forming a cover, and a second substrate forming a support, the substrates sandwiching between two electrode-forming conductive layers at least one functional layer based on an absorber material for converting light energy into electrical energy, the second substrate provided on its lower face with a plurality of profiles oriented parallel to one of the sides of the element.

17 Claims, 7 Drawing Sheets

(56) References Cited

U.S. PATENT DOCUMENTS

| | | | |
|---|---|---|---|
| 5,740,996 A * | 4/1998 | Genschorek | 248/237 |
| 6,111,189 A * | 8/2000 | Garvison et al. | 136/244 |
| 6,201,179 B1 * | 3/2001 | Dalacu | 136/244 |
| 6,498,289 B1 * | 12/2002 | Mori et al. | 136/244 |
| 2003/0034029 A1 | 2/2003 | Shingleton | |
| 2003/0070368 A1 * | 4/2003 | Shingleton | 52/173.3 |
| 2004/0140002 A1 | 7/2004 | Brown et al. | |
| 2005/0144870 A1 * | 7/2005 | Dinwoodie | 52/418 |
| 2005/0257453 A1 * | 11/2005 | Cinnamon | 52/173.3 |
| 2006/0086382 A1 | 4/2006 | Plaisted | |
| 2009/0114270 A1 * | 5/2009 | Stancel | 136/251 |
| 2009/0283136 A1 * | 11/2009 | Munch et al. | 136/251 |

FOREIGN PATENT DOCUMENTS

| | | |
|---|---|---|
| DE | 10 2005 057 468 | 5/2007 |
| EP | 1 601 022 | 11/2005 |
| EP | 1813738 A1 * | 8/2007 |
| FR | 2 581 603 | 11/1986 |
| GB | 2341618 A * | 3/2000 |
| JP | 8 181345 | 7/1996 |
| JP | 2004324233 A * | 11/2004 |
| JP | 2006 278738 | 10/2006 |
| WO | WO 2006121013 A1 * | 11/2006 |
| WO | 2006 132265 | 12/2006 |
| WO | WO 2007062633 A2 * | 6/2007 |
| WO | WO 2008124158 A1 * | 10/2008 |

OTHER PUBLICATIONS

Machine translation of JP2004-324233A.*
Definition of reinforce [retrieved from internet at http://www.thefreedictionary.com/reinforce on Jan. 28, 2014].*
Definition of elongate [retrieved from internet at http://www.thefreedictionary.com/elongate on Jan. 28, 2014].*
U.S. Appl. No. 12/738,490, filed Jun. 14, 2010, Kuster, et al.

* cited by examiner

MADE TO ELEMENTS CAPABLE OF COLLECTING LIGHT

CROSS-REFERENCE TO RELATED APPLICATION

The present application is the US national stage application of PCT/EP2008/063744 filed on 13 Oct. 2008, the text of which is incorporated by reference, and claims the priority of French application No. 07 58350 filed on 16 Oct. 2007, and French Application No. 0852216 filed on 3 Apr. 2008, the text of which are incorporated by reference.

The present invention relates to improvements made to elements capable of collecting light.

It is known that elements capable of collecting light of the photovoltaic solar cell type comprise an absorber agent and two electrodes electrically on any face. The whole assembly is encapsulated between two substrates, one of which constitutes a protective substrate having a glass function, so as to allow light to pass through it, and the other substrate forms a support and is not necessarily transparent. The electrodes are essentially characterized by a surface electrical resistance as low as possible and good adhesion to the absorber layer and, where appropriate, to the substrate. The electrodes are most often made of metal or from a metal oxide, for example based on molybdenum, silver, aluminum, copper, doped zinc oxide, or tin oxide.

These elements capable of collecting light are assembled in the form of a laminated glazing unit that is held in a metal frame or superstructure that has both to provide the unit with its mechanical rigidity and to allow it to be combined with other similar glazing units, for the purpose of obtaining a larger active surface area.

Generally, the metal frame is produced from U-sections, the arms of the U holding a surface portion located on the periphery of each of the substrates. These covered regions necessary for the mechanical assembly are in fact masked parts of the active surface and constitute surfaces that cannot be used for converting light into electrical energy, thereby reducing the actual active surface area. Yet, manufacturers certify their module according to an electrical power obtained per unit surface area. It will be readily understood that manufacturers constantly seek to provide an active surface area as close as possible to the actual surface area of the panel.

A second problem associated with the assembly method by means of a metal frame has been identified. This relates to the heating of the modules. This is because when modules are assembled together edge to edge along their facing metal part, so as to form high-power conversion surfaces, it has been found that the temperature of the modules increases due to being heated by the sun, the vertical parts of the superstructure being deleterious to establishing a convective air current needed for cooling. Indeed, it is known that the efficiency of a solar or photovoltaic module is inversely proportional to the temperature of said module.

This problem of the lack of convective motion cannot be solved by the frames of the prior art—they have reached their limit. In fact, the modules should then be assembled onto a support while taking care to leave a space between two modules for passage of a convective air current. Such a procedure amounts to further increasing the surface area used relative to the actually active surface area useful for energy conversion.

The object of the present invention is to alleviate the drawbacks by proposing a module assembly technique that maximizes the ratio of the surface area of the module to the active surface area of the panel.

For this purpose, the element capable of collecting light, comprising a first substrate having a glass function and forming a cover, and a second substrate forming a support, said substrates sandwiching between two electrode-forming conductive layers at least one functional layer based on an absorber material for converting light energy into electrical energy, is characterized in that the second substrate is provided on its lower face with a plurality of profiles oriented parallel to one of the sides of said element.

In preferred embodiments of the invention, one or more of the following arrangements may optionally be furthermore employed:
  the element is of substantially polygonal, especially rectangular, shape;
  the element has, on its lower face, at least two profiles oriented so as to be parallel to the vertically located sides when the element is assembled with a superstructure;
  it includes a locking device for locking said element to a carrier structure and for unlocking it therefrom;
  the locking device includes a keyhole;
  the profiles are assembled by adhesive bonding to a surface portion of the support substrate;
  the profiles have a cross section in the form of a square, of a double T or H, of an I or of a rectangle;
  the profiles are ribbed and have contact regions with the superstructure and/or the lower face of said element;
  the ribbed profiles are provided with a plurality of recesses;
  the ribbed profiles have a notch for the passage of a junction box;
  one of the contact regions includes a safety device; and
  one of the contact regions has a lug with a clamp and a tightening member connected to the superstructure.

According to another aspect, the subject of the invention is also a table, suitable for being fastened to a carrier structure, comprising a plurality of juxtaposed elements as described above.

According to a preferred feature, the table has a size compatible with an "Inloader"-type means of transport.

Other features, details, and advantages of the present invention will become more clearly apparent on reading the following description, given by way of illustration and implying no limitation, with reference to the appended figures in which.

Figure 1A:
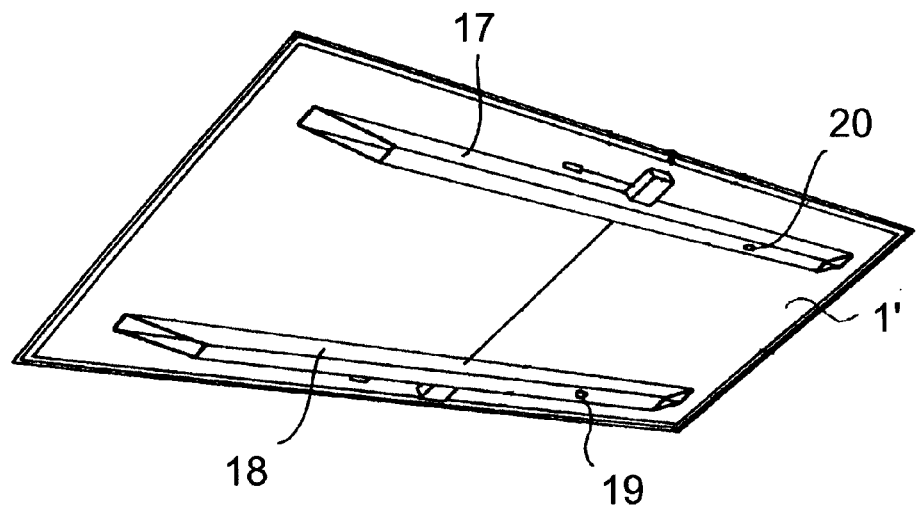
FIGS. 1a and 1b are a perspective view of an element capable of collecting light according to the invention.

FIG. 1a shows an element capable of collecting light, in particular a solar or photovoltaic cell. Schematically, two substrates 1 and 1', at least one of which is necessarily transparent for letting light pass through, sandwich a multilayer stack 7 comprising, between electrode-forming electrically conductive layers 2, 6, a functional layer 3 based on an absorber agent for converting light energy into electrical energy. These stacks are visible in FIGS. 2 and 3.

The substrate 1 forming a cover is transparent and may for example be made entirely of glass. It may also be made of a thermoplastic polymer, such as a polyurethane, a polycarbonate or a polymethyl methacrylate.

Most of the mass (i.e. for at least 98% by weight) or even all of the substrate having a glass function consists of material(s) exhibiting the best possible transparency and preferably having a linear absorption of less than 0.01 mm$^{-1}$ in that part of the spectrum useful for the application (solar module), generally the spectrum ranging from 380 to 1200 nm.

The substrate 1 forming a cover according to the invention may have a total thickness ranging from 0.5 to 10 mm when it is used as protective plate for a photovoltaic cell produced from various technologies, e.g. CIS, amorphous silicon, microcrystalline silicon, crystalline silicon. In this case, it may be advantageous to subject this plate to a heat treatment (for example of the toughening type) when it is made of glass.

The CIS technology involves chalcopyrite ternary compounds that act as absorber agents, which generally contain copper, indium and selenium. Layers of such absorber agent are referred to as $CISe_2$ layers. The layer of absorber agent may also contain gallium (e.g. $Cu(In,Ga)Se_2$ or $CuGaSe_2$), aluminum (e.g. $Cu(In,Al)Se_2$) or sulfur (e.g. $CuIn(Se,S)$). They are denoted in general, and hereafter, by the term chalcopyrite absorber agent layers.

Another family of absorber agent, in the form of a thin film, is either based on silicon, which may be amorphous or microcrystalline, or based on cadmium telluride (CdTe). There also exists another family of absorber agent based on polycrystalline silicon, deposited as a thick film, with a thickness between 50 μm and 250 μm, unlike the amorphous or microcrystalline silicon system, which is deposited as a thin film.

The substrate 1' forming a support plate differs from the substrate 1 by the fact that it is not necessarily transparent, and therefore does not necessarily have a glass function.

Figure 2:
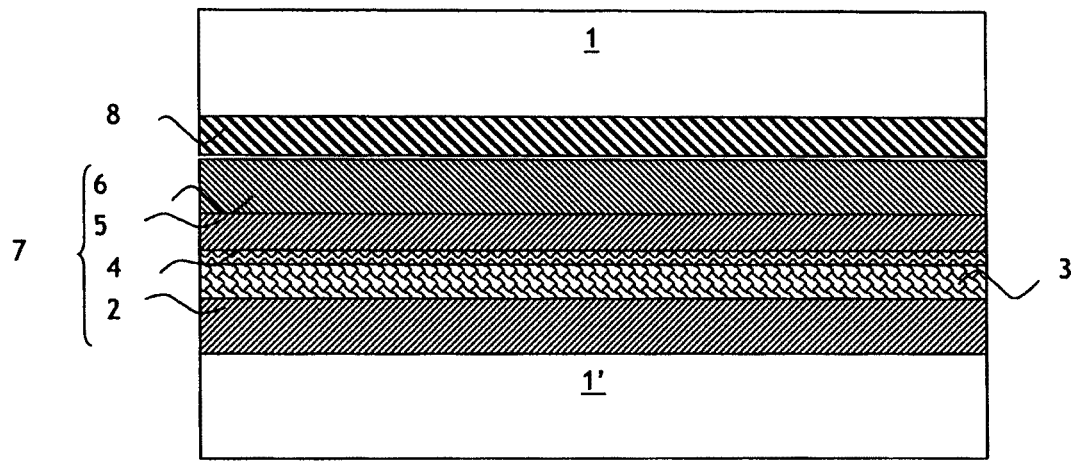
FIGS. 2 and 3 are schematic views of an element capable of collecting light.
Figure 3:
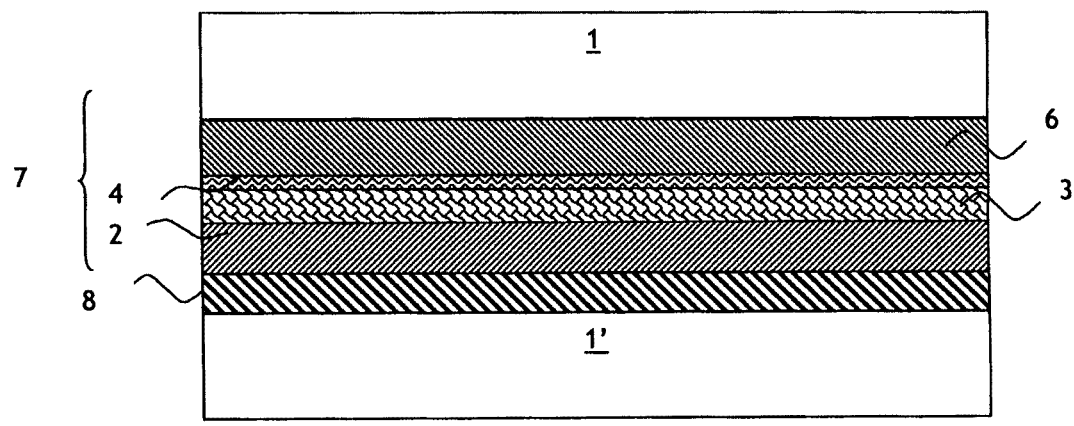

Referring to FIG. 2, a first conductive layer 2 having to serve as an electrode is deposited on one of the main faces of the substrate 1'. The functional layer 3 based on a chalcopyrite absorber agent is deposited on this electrode 2. When this is a functional layer based for example on CIS, CIGS or $CIGSe_2$, it is preferable for the interface between the functional layer 3 and the electrode 2 to be based on molybdenum. A conductive layer meeting these requirements is described in European Patent Application EP 1 356 528.

The layer 3 of chalcopyrite absorber agent is coated with a thin layer 4 called a buffer layer made of cadmium sulfide (CdS), zinc sulfide (ZnS) or indium sulfide (IS), making it possible to create, with the chalcopyrite layer, a pn junction. This is because the chalcopyrite agent is generally p-doped, the buffer layer, in particular made of CdS, being n-doped. This allows the creation of the pn junction needed to establish an electrical current.

This thin buffer layer 4, for example made of CdS, is itself covered with an adhesion layer 5, generally made of undoped zinc oxide (ZnO).

To form the second electrode 6, the ZnO layer 5 is covered with a layer of TCO (Transparent Conductive Oxide). It may be chosen from the following materials: doped tin oxide, especially zinc oxide doped with boron or aluminum. In the case of doped zinc oxide, especially aluminum-doped zinc oxide, the precursors that can be used in the case of CVD deposition may be zinc and aluminum organometallics or halides. The TCO electrode, for example ZnO electrode, may also be deposited by sputtering using a metal or ceramic target.

Moreover, this conductive layer must be as transparent as possible and have a high light transmission over all the wavelengths corresponding to the absorption spectrum of the material constituting the functional layer, so as not to unnecessarily reduce the efficiency of the solar module.

One or the other of the conductive layers 2, 6 has a sheet resistance of at most 30 ohms per square, especially at most 20 ohms per square, preferably at most 10 or 15 ohms per square. It is generally between 5 and 12 ohms per square.

The stack 7 of thin layers is sandwiched between the two substrates 1 forming a cover and 1' forming a support via a lamination interlayer or encapsulant 8, for example made of PU, PVB or EVA. The substrate 1 differs from the substrate 1' by the fact that it has a glass function, such as a soda-lime-silica glass, so as to form a solar or photovoltaic cell, and then encapsulated peripherally by means of a sealant or sealing resin. An example of the composition of this resin and its methods of use is described in Application EP 739 042.

If an absorber agent of the silicon type, namely amorphous silicon or microcrystalline silicon, or an absorber agent based on cadmium telluride (CdTe) is used in the form of a thin film, the construction of the element capable of collecting light is produced in the opposite way to that used for the chalcopyrite system. The construction is then referred to as a "superstrate" construction as opposed to what is called the "substrate" construction. The reader may refer to FIG. 3.

The essential difference lies in the fact that the stack of thin layers is constructed starting from the substrate 1 forming a cover. The B face (the main internal face) of the substrate 1 is coated with a first conductive layer 6 having to serve as an electrode. The functional layer based on an absorber agent made of amorphous or microcrystalline silicon or of cadmium telluride is deposited on this electrode.

To form the first electrode 6, the layer is based on a TCO layer. It may be chosen from the following materials: doped tin oxide, especially tin oxide doped with boron or aluminum. In the case of doped zinc oxide, especially aluminum-doped zinc oxide, the precursors that can be used in the case of CVD deposition may be zinc and aluminum organometallics or halides. The TCO electrode, for example ZnO electrode, may also be deposited by sputtering using a metal or ceramic target.

This conductive layer must be as transparent as possible and have a high light transmission over all the wavelengths corresponding to the absorption spectrum of the material constituting the functional layer, so as not to unnecessarily reduce the efficiency of the solar module.

This TCO layer 6, for example based on $SnO_2$:F or ZnO:Al, is optionally covered with an additional, relatively thin (for example 100 nm), undoped ZnO layer 5. This thin ZnO layer is then covered with the functional layer 3 based on silicon or on cadmium telluride in the form of a thin film. The rest of the stack 7 consists of a second conductive layer 2 serving as an electrode, made of a metallic material or metal oxide. Conventionally, this conductive layer is based on ITO (indium tin oxide) or a metal (copper, aluminum).

One or the other of the conductive layers 2, 6 has a sheet resistance of at most 30 ohms per square, especially at most 20 ohms per square, preferably at most 10 or 15 ohms per square. It is generally between 5 and 12 ohms per square.

The stack of thin layers is sandwiched between the two substrates 1 and 1' via a lamination interlayer or encapsulant 8 for example made of PU, PVB or EVA. The substrate 1' differs from the substrate 1 by the fact that it is not necessarily made of glass and is not necessarily transparent. It acts as a support and is encapsulated with the other substrate 1 peripherally by means of a sealant or sealing resin. An example of the composition of this resin and of its methods of use is described in Application EP 739 042.

A third configuration consists of the construction of elements (solar modules), the absorber agent of which is based on crystalline silicon. The silicon wafers are then assembled by means of an EVA, PU or PVB lamination interlayer between the two substrates 1, 1' forming the cover and the support of the element, respectively. The electroconductive layers 2, 6 forming the electrodes, in the form of layers or grids, are deposited on each of the substrates and are obtained by a screen-printing technique using metal compounds.

A solar module as described above must, in order to be able to operate and deliver an electrical voltage to an electrical distribution network, be provided with support and fastening means for ensuring its orientation relative to the light radiation.

Figure 4:
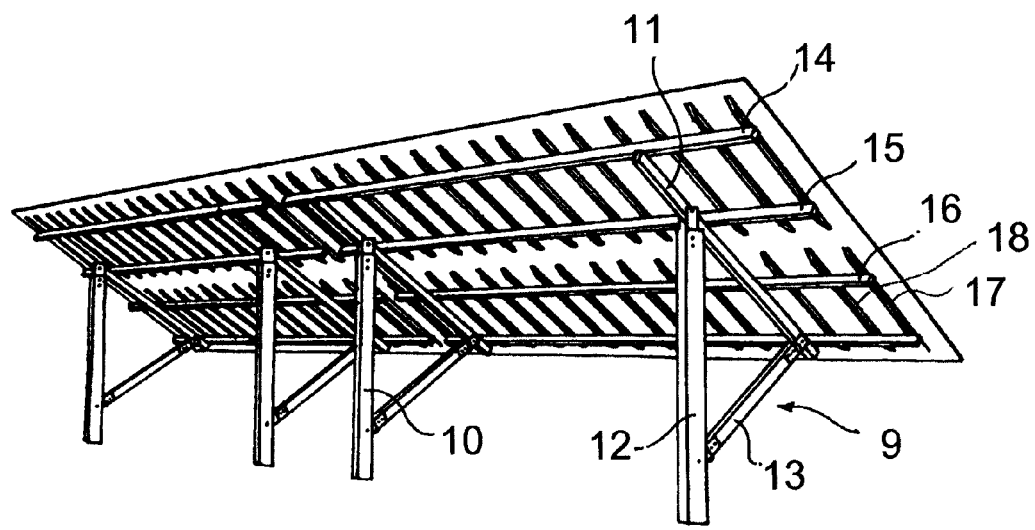
FIG. 4 is a perspective view of a carrier structure supporting tables, each of these tables comprising a juxtaposition of elements according to FIGS. 1a and 1b.

To do this, and with reference to FIG. 4, the solar module must rest on a support framework intended to be fastened on a flat roof or on a wall of a building, or more generally on the ground. This support framework 9 comprises, on the one hand, a first part 10 connected to the carrier structure (ground, wall, roof, etc.) and, on the other hand, a second part 11 intended to receive the solar cell, resting on the first part and generally inclined relative to the horizontal so as to be at an optimum orientation relative to the light radiation.

The first part 10 of the framework visible in FIG. 4 generally comprises a plurality of metal beams 11, 12, arranged together so as to form a triangulate framework obtained by assembling a plurality of parallel beams connected by beam elements 14, 15, 16, the beam elements being intended to accommodate a plurality of juxtaposed solar modules.

Conventionally, this framework may be produced from the assembly of a plurality of metal profiles having a standard cross section, such as a square cross section, an I cross section, a U cross section or an H (or double T) cross section, fastened together by any welding or similar method.

According to a preferred embodiment (refer to FIG. 1*a*), the second part of the framework consists of an assembly of cross-members 17, 18 positioned on the lower face of the solar module (the back) and oriented parallel to the longest edges. These profiles of polygonal cross section, for example a square, rectangular, H (or double T), or I cross section, are fastened to the lower face of the solar module, for example by adhesive bonding.

According to another embodiment (see FIG. 1*b*), if the element is oriented in what is called a "landscape" direction, the profiles uniformly distributed on the lower face of the element, of which there are preferably at least two, are positioned parallel to the short sides.

As a variant (see FIGS. 8 and 9), the profile (or section) 17, 18 is obtained by bending or stamping a metal sheet, this metal sheet having been pierced beforehand so as to form a plurality of orifices or recesses 29, the removal of material allowing the weight of the sheet to be substantially reduced without thereby affecting the mechanical properties thereof. The ribbed profile 17, 18 has a complex cross section obtained by the edge-to-edge juxtaposition of profiles with a simple, especially U or V, cross section having a convex and/or concave shape.

The cross section of the profile 17, 18 is generally in the form of two inverted Vs or Us, the junction regions 30, 31 between the Vs forming flat parts so as to form contact regions, for contact either with the rear face of the module or with the carrier structure.

Figure 8:
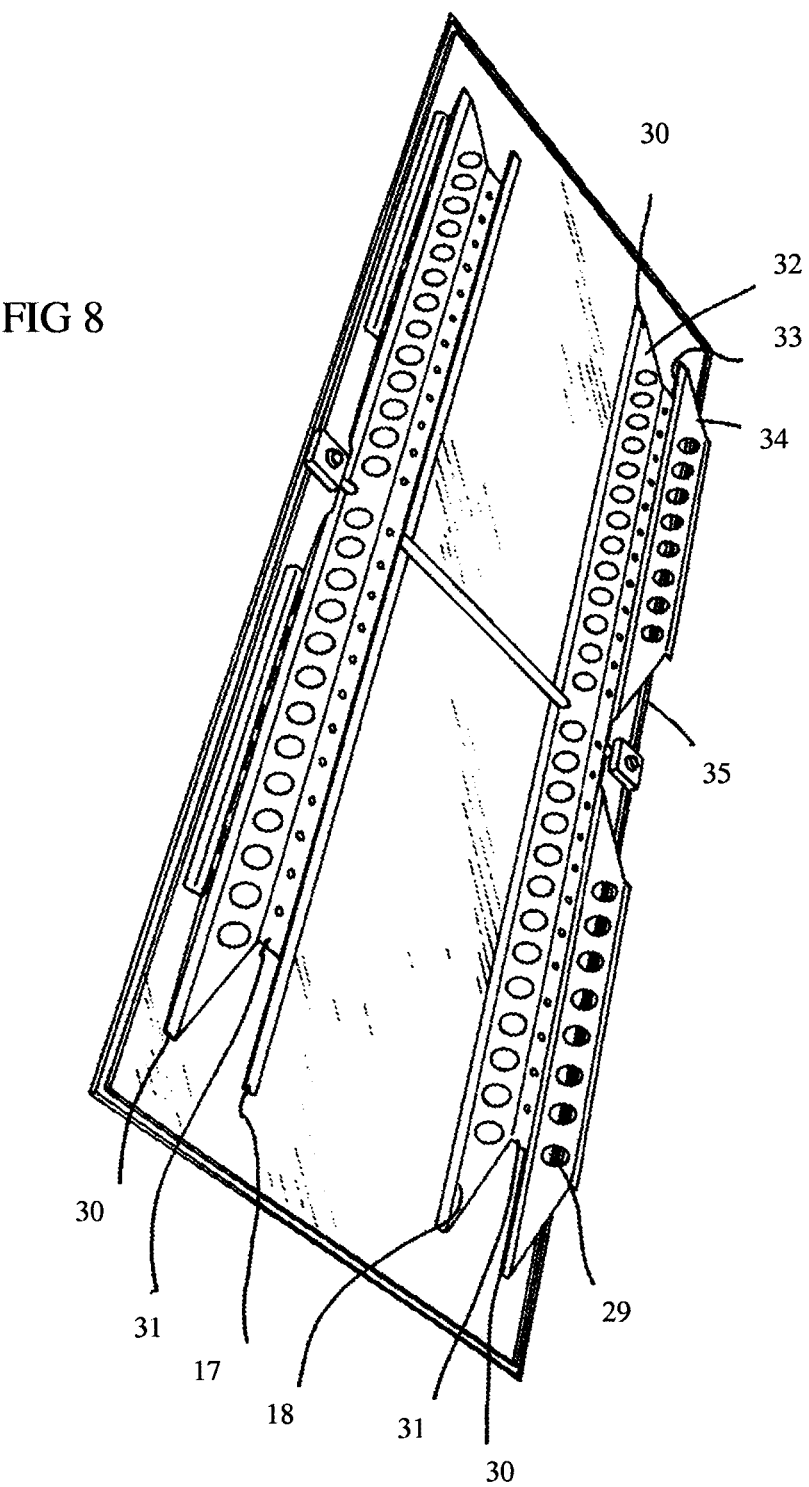
FIG. 8 is a perspective view from below of a carrier structure supporting an element capable of collecting light.
Figure 9:
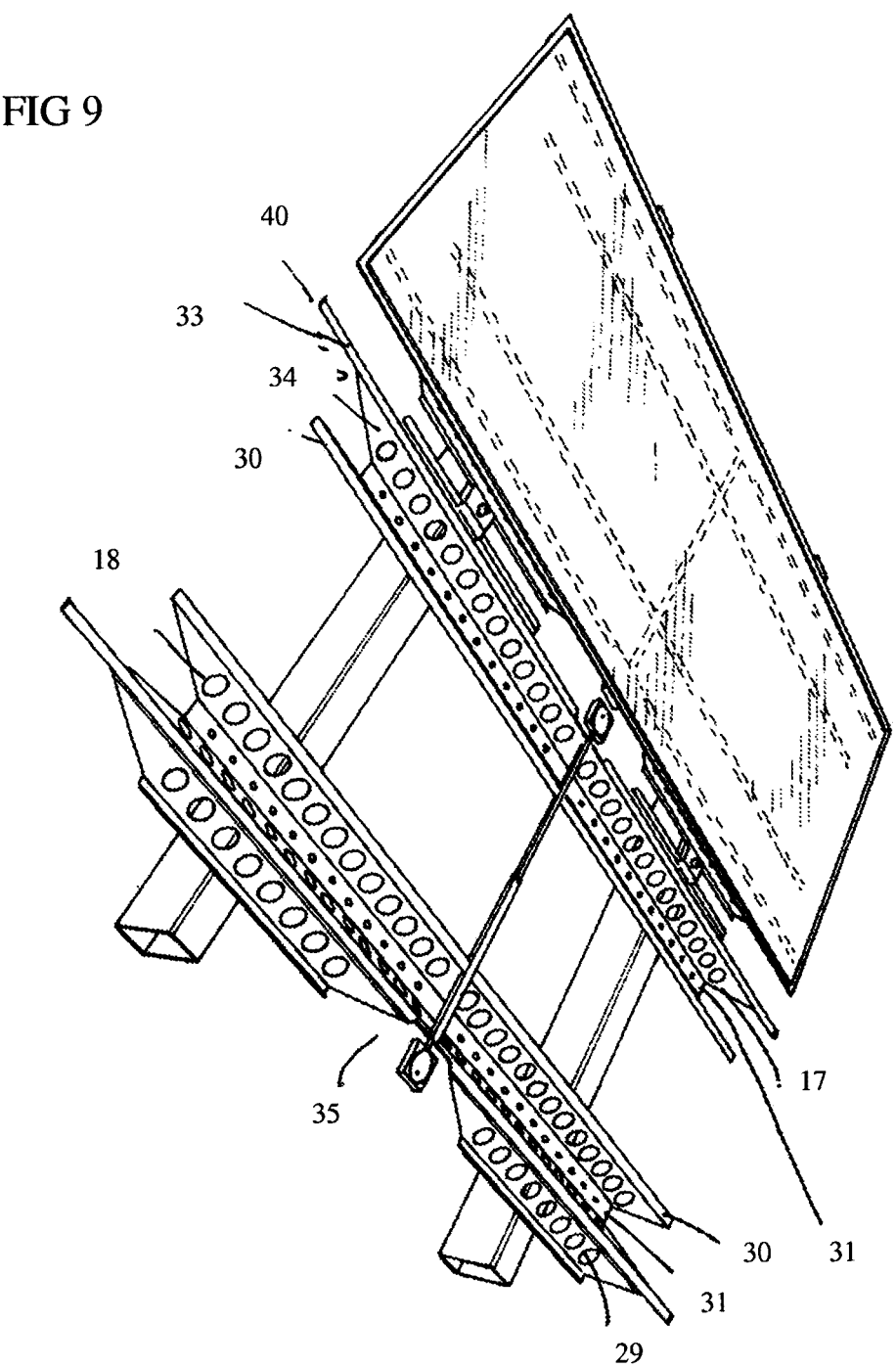
FIG. 9 is a perspective view of a carrier structure represented without the table.

Thus, the profile 17, 18 shown in FIGS. 8 and 9 has a first flat region 30 extending parallel to one of the sides of the module and intended to form a contact region for contact with the rear face of the module, for example by bonding. Projecting from the longitudinal edge of this flat region 30 there is a first arm 32 of the V-rib, and this arm 32 is provided with a plurality of orifices 29, thus lightening it without thereby affecting its mechanical properties (torsional strength). This approximately vertical or oblique arm 32, depending on the opening of the V, cooperates, at its other longitudinal edge, with another flat region 31 which is parallel to the first flat region and intended to form a contact region for contact with the carrier structure (visible in FIG. 9). This flat region 31 may be perforated (holes can be seen in FIG. 9) for weight saving reasons.

Projecting from the longitudinal edge of this second flat region 31 is the second arm 33 of the V-rib. In a manner similar to the previous one, this arm 33 is also provided with a plurality of orifices 29, obtained by piercing the metal sheet before bending it. This second arm 33 constitutes in fact an arm that is common with the second V-rib. This second arm 33 is continued by a third flat region 30, the role of which is identical to that of the first region (the region of contact with the rear face of the module). Extending from the longitudinal edge of this third flat region 30 is the last arm 34 of the V-rib, this last arm 34 being, like the previous ones, provided with a plurality of orifices 29 for lightening the assembly.

As may be seen in FIGS. 8 and 9, this last arm 34 is provided approximately in its central part with a notch 35. This notch 35 creates a removal of material in the arm so as to ensure access to the connection or junction boxes located on the rear face of the module. The notch 35 is obtained by cutting the metal sheet before it is bent.

The last arm 34 has, at its longitudinal edge, a flat region 36 (seen in FIG. 10) approximately in the same plane as the second flat region 31 and intended to form a contact region for contact with the carrier structure.

However, it is distinguished by the fact that it includes a lug 37 for clamping with a clamp 38 and a tightening member 39 connected to the superstructure or carrier structure. The clamp, when it is unclamped from the carrier structure, can be easily moved along the lug, thus giving a few degrees of freedom for assembling the modules to the carrier structure.

Figure 10:
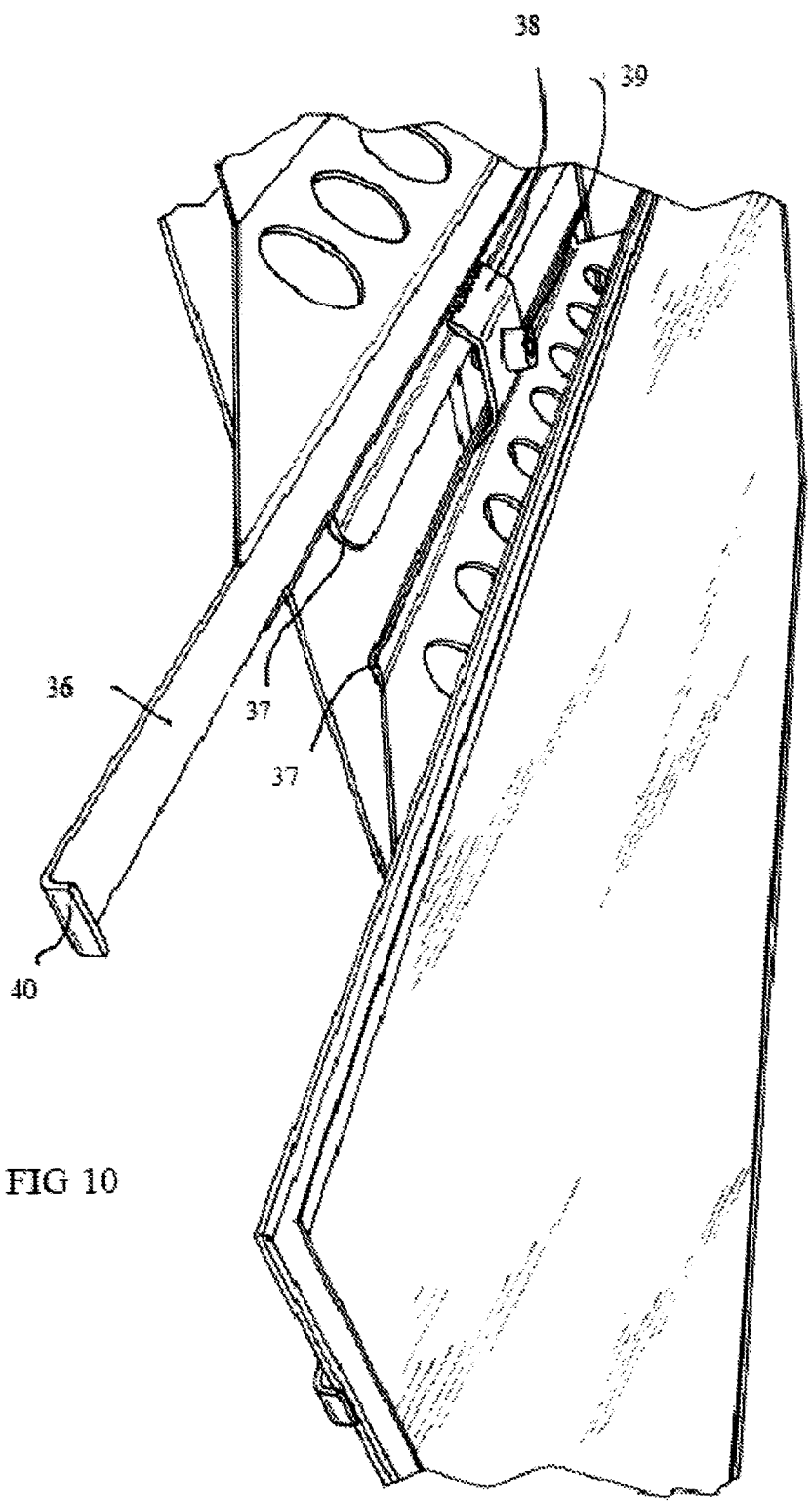
FIG. 10 is a detailed perspective view of the carrier structure.

The way a module is assembled to the carrier structure can be seen in FIG. 10.

According to a preferred feature of the invention, the ribbed profile is symmetrical and all that is required is to rotate the latter, as is apparent from FIGS. 8 and 9, in order to position and assemble on a rear face of the module at least two ribbed profiles, starting from a single template of ribbed profile.

According to another preferred feature of the invention, at least one of the flat surfaces 30, 36 intended to come into contact with the rear face of the photovoltaic module is provided with a safety device 40 which retains the module if the latter is disconnected from the ribbed profile. This is a leg manufactured directly as one piece during the stamping operation or else attached to at least one of said flat surfaces. It should be pointed out that the length of these legs is adapted so as to correspond substantially to one of the specific dimensions of the module (in this case, in the figures, the length) and terminates in a curved part so as to retain said panel by pinching it.

In general, these safety devices 40 will be used when the panels assembled on their carrier structure are in an inclined position and liable to fall because of their own weight.

In the examples shown in FIGS. 8, 9, 10, the ribbed profiles 17, 18 are made of metal, but it would be conceivable to have profiles of identical shape made of plastic and obtained by a plastic extrusion technique. In this mode of construction from plastic, the plastic profiles would possibly not be apertured, completely or partly, the weight saving being achieved by the choice of the material.

Whatever the mode of construction, the profiles are placed parallel to one of the edges of the module so that, when the module is assembled on the superstructure or the support framework, the profile lies vertically and parallel to one of the sides, thus promoting convective motion and therefore cooling of the module.

Within the context of the invention, "lower face" refers to that face of the support substrate that faces the carrier structure or superstructure.

Figures 1B, 7:
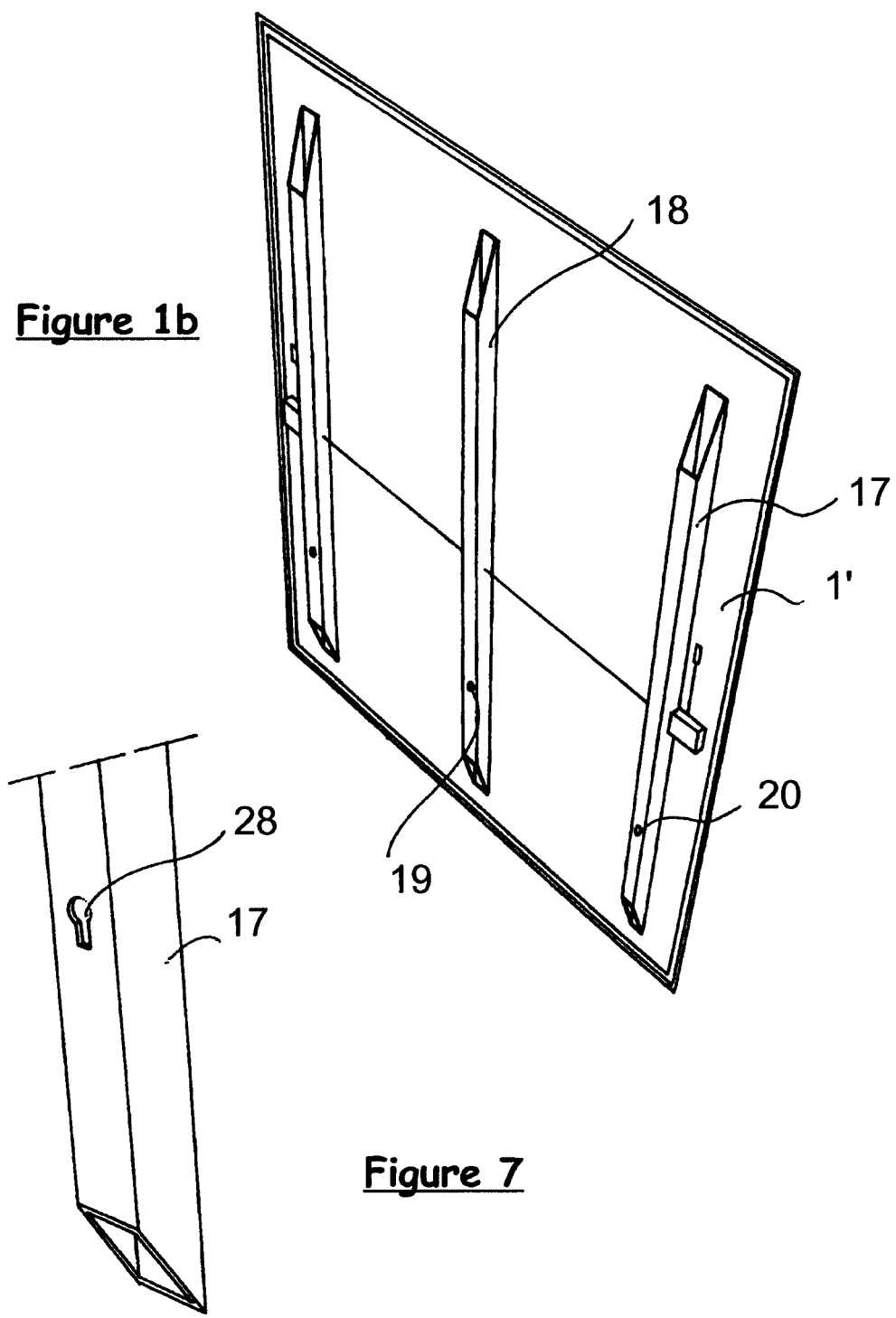
FIG. 7 illustrates a second locking mode, in the form of a keyhole.

To be able to keep the modules in position and in a fixed spatial configuration on the framework, each of the profiles fastened to the modules may be provided with a plurality of orifices 19, 20 on the face that has to be in contact with the framework. Each of these orifices 19, 20 is intended to receive a centring pin 21, 22 or stud projecting from cross-members of the carrier structure (refer to FIGS. 5 and 6). Thus, each of the modules, as shown in FIG. 1a or 1b, has on its lower face two profiles 17, 18 positioned parallel to the longest edges, each of these profiles having at least one (preferably two) orifices 19, 20 cooperating with a stud 21, 22, thus making it possible, by means of two profiles, to position the module in all directions in space on its carrier structure. It should be noted that there are U-shaped elements 23, 24 centred on each of the studs, the spacing of which, between the two arms of the U, will be chosen to be slightly greater than the thickness of the profile and will ensure optimum positioning and ease of fitting.

Figure 5:
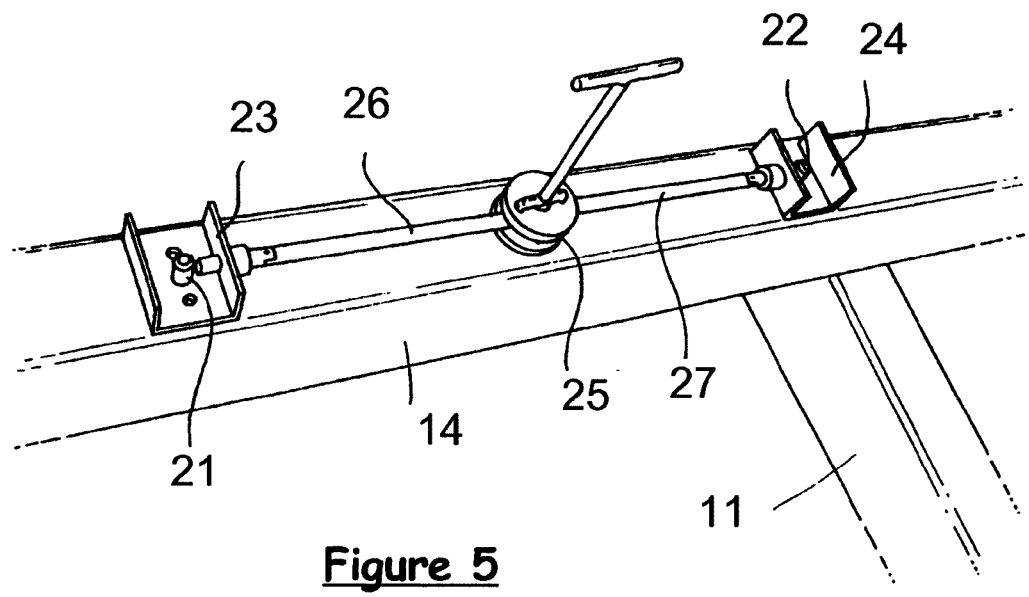
FIGS. 5 and 6 are views, on a large scale and in perspective, of the fastening system for mechanically coupling a module to the framework.
Figure 6:
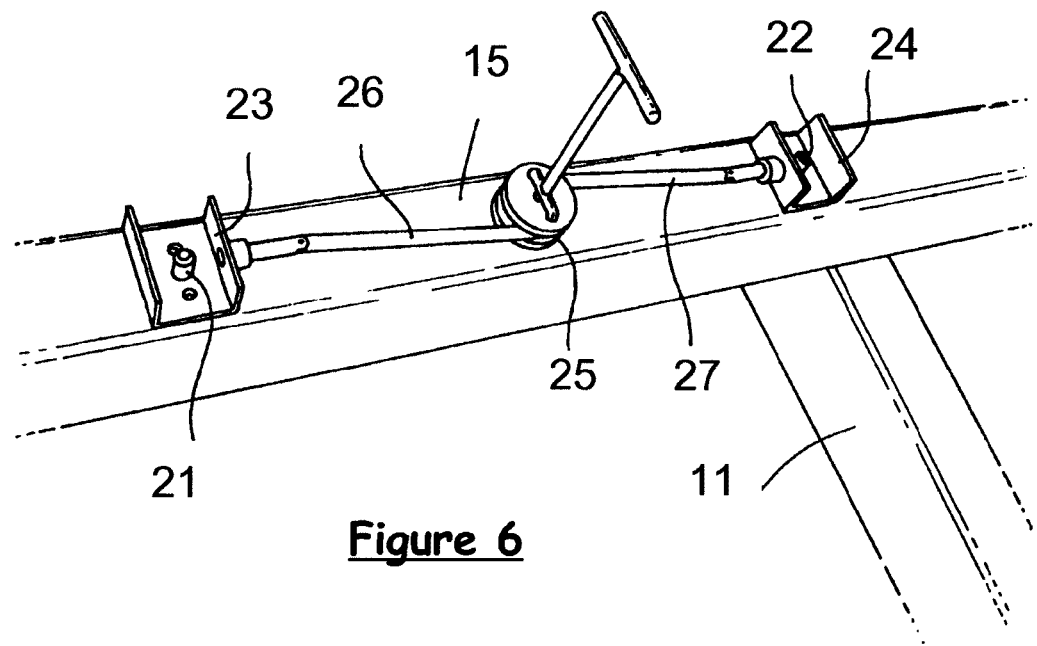

A locking device for locking the modules onto the carrier structure and for unlocking them therefrom can be seen in FIGS. 5 and 6. This locking/unlocking device 25 is based on an eccentric system, which allows two articulated arms 26, 27 to be actuated, these arms being able to occupy a first, locking position (see FIG. 5), in which the arms 26, 27 are aligned along a diameter and each of their ends passes both through a first orifice made in a U-shaped element 23 or 24 and through a facing second orifice made in a profile fastened to the lower face (or back) of the module, and a second, unlocking position (refer to FIG. 6) in which the ends of each of the arms 26, 27 do not cooperate in each of the orifices made in the U-shaped elements 23 or 24.

As may be seen in FIGS. 5 and 6, the eccentric is controlled by a key. A movement of a quarter of a turn clockwise and then anticlockwise makes it possible to actuate the free end of the arms of the locking/unlocking device in a manner similar to the bolt of a lock.

According to another embodiment of the locking system (cf. FIG. 7), each of the studs 21, 22 cooperates with an orifice in the form of a keyhole 28 in the profiles of the carrier structure. The diameter restriction of this keyhole shape provides mechanical blocking of the module during displacement of the stud within these two orifices, during relative movement of the module with respect to the carrier structure.

To facilitate the logistics, handling and storage, provision is made to arrange the modules in table form (refer to FIG. 4). Each of the tables consists in fact of two rows of two beam elements. Each of the pairs of beam elements makes it possible to fasten $2^n$ modules (where n is strictly positive) that are juxtaposed edge to edge. In the example shown, this table therefore consists of eighteen modules arranged in two rows. This arrangement in table form offers many advantages:

- a table corresponds substantially to the internal dimension of truck trailers especially designed for transporting glass. As a variant, the table may have a dimension corresponding to a submultiple of the internal dimension of the trailers. A description of these truck trailers or these trucks, commonly referred to as "Inloaders", is given for example in Applications FR 2 581 603 or FR 2 867 118;
- each of the tables delivers approximately one given energy unit (EU), which will be easy to count and multiply in order to obtain the desired powers; and
- it is possible to adapt the routes of the Inloaders optimally, the Inloaders being for example able to supply the unit for manufacturing the solar modules with glass substrates of full float length (in French, PLF [Plateau Largeur Fabrication]) or cut float width (in French, DLF [Découpé Largeur Fabrication]) type and then, when the modules are manufactured and arranged in table form, to leave again with the tables ready to be delivered to the final customer. In this way, the flow of material and the means of transport are optimally managed.

The invention claimed is:

1. A solar module, comprising a first substrate having a glass function and forming a cover, and a second substrate forming a support, the first substrate and the second substrate sandwiching between two electrode-forming conductive layers at least one functional layer based on an absorber material for converting light energy into electrical energy, the module further comprising at least two elongated reinforcing profiles fastened to the lower face of the second substrate, wherein the elongated reinforcing profiles are oriented parallel to one of the sides of the module and are uniformly distributed on said lower face, wherein the profiles are internally offset relative to the sides of the module and wherein the profiles are configured for attachment to (1) a support framework attached to a carrier structure or (2) a carrier structure, wherein each profile has a cross section in the form of two inverted Vs or two inverted Us, wherein each profile comprises:
   a first flat region extending parallel to one of the sides of the module configured to form a contact region for contact with the rear face of the module,
   a first arm projecting from a longitudinal edge of the first flat region,
   a second flat region parallel to the first flat region projecting from the first arm at its other longitudinal edge configured to form a contact region for contact with the support framework or carrier structure,
   a second arm projecting from the longitudinal edge of the second flat region,
   a third flat region parallel to the first flat region projecting from the second arm at its other longitudinal edge configured to form a contact region for contact with the rear face of the module,
   a third arm projecting from the longitudinal edge of the third flat region,
   a fourth flat region parallel to the first flat region projecting from the third arm at its other longitudinal edge configured to form a contact region for contact with the support framework or carrier structure,
   wherein the first arm and second arm form a first V or U and the second arm and third arm form a second V or U, with the second V or U being inverted with respect to the first V or U.

2. The module according to claim 1, wherein the first substrate and the second substrate are of substantially polygonal shape.

3. The module according to claim 1, comprising, fastened to its lower face, at least two profiles oriented so as to be parallel to the vertically located sides of the module when the module is assembled with a support framework attached to a carrier structure or a carrier structure.

4. The module according to claim 1, wherein each profile is ribbed and has at least one contact region with a support framework attached to a carrier structure or a carrier structure and at least one contact region with the lower face of said module.

5. The module according to claim 1, wherein each profile is provided with a plurality of recesses.

6. The module according to claim 1, wherein each profile has a notch for the passage of a junction box.

7. The module according to claim 1, wherein at least one of the profiles comprises a safety device in the form of a leg terminated by a curved part, to retain the element if the latter is disconnected from the profile.

8. The module according to claim 1, wherein each profile comprises, at one of the contact regions with a support framework attached to a carrier structure or a carrier structure, a lug suitable for being clamped, relative to a carrier structure, with a clamp and a tightening member connected to the carrier structure.

9. The module according to claim 8, wherein the lug is suitable for being clamped relative to a support framework attached to a carrier structure or a carrier structure with the clamp and the tightening member from the upper side of the module.

10. The module according to claim 1, further comprising a locking device for locking said module to a support framework attached to a carrier structure or a carrier structure.

11. The module according to claim 10, wherein the locking device has a keyhole.

12. The module according to claim 1, wherein each profile includes at least one orifice for centering said module on a support framework attached to a carrier structure or a carrier structure.

13. The module according to claim 1, wherein each profile is assembled by adhesive bonding to a surface portion of the second substrate.

14. The module according to claim 1, wherein the first substrate and the second substrate are of rectangular shape.

15. The module according to claim 1, wherein the module is frameless.

16. A table, suitable for being fastened to a support framework attached to a carrier structure or a carrier structure, comprising a plurality of juxtaposed modules according to claim 1.

17. A table according to claim 16, having a size compatible with an Inloader.

* * * * *